H. A. ZOPFF.
Steam Cooking Apparatus.
No. 77,702.
Patented May 5, 1868.
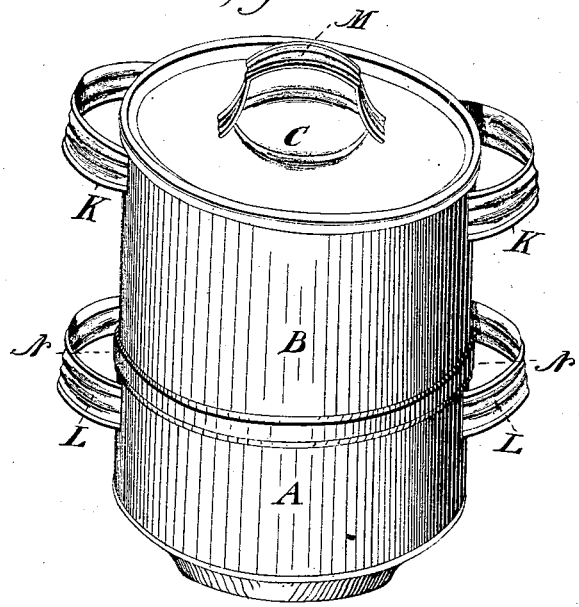
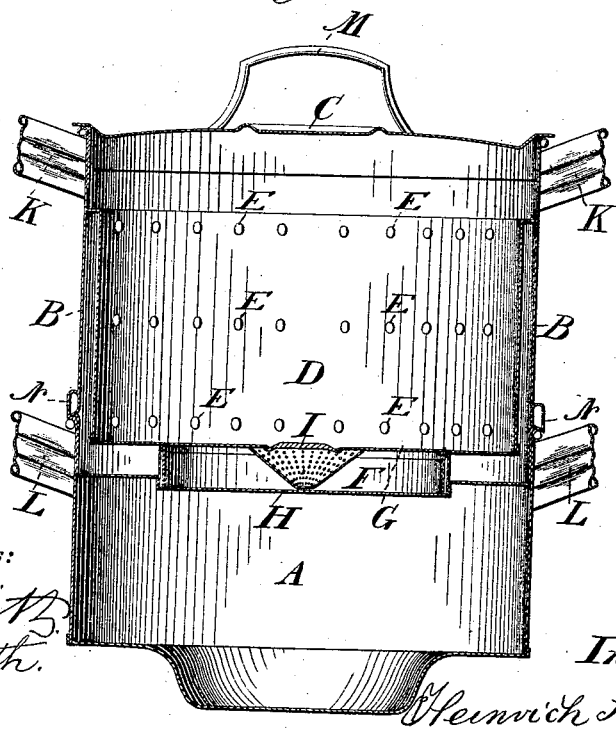
Witnesses:
Inventor:
Heinrich A. Zopff.

United States Patent Office.

HEINRICH A. ZOPFF, OF MILWAUKEE, WISCONSIN.

Letters Patent No. 77,702, dated May 5, 1868.

IMPROVEMENT IN CULINARY APPARATUS.

*The Schedule referred to in these Letters Patent and making part of the same.*

TO ALL WHOM IT MAY CONCERN:

Be it known that I, HEINRICH A. ZOPFF, of the city and county of Milwaukee, and State of Wisconsin, have invented a new and useful Improvement in Steam-Cooking Apparatus; and I do hereby declare that the following is a full, clear, and exact description thereof, which will enable those skilled in the art to make and use the same, reference being had to the accompanying drawing, forming part of this specification, in which—

Figure 1 is a perspective view.

Figure 2, a vertical sectional view.

Similar letters of reference in each of the figures indicate corresponding parts.

The object of my invention is to produce an apparatus for the cooking of vegetables by steam, and so arranged as to preserve all the agreeable taste, and do away with all unpleasantness to the palate, which is sometimes objectionable in the ordinary way of cooking. My steaming-apparatus is made of any suitable metal.

A is a pot, to contain water, over which the apparatus sets; B, the outer shell of the steaming-apparatus; C, cover; D, the inner shell of the steamer, perforated with holes. This shell has a tight bottom, and is connected at its top to the outer shell B, so as to leave a hollow space around between the two, and open at the bottom. E, perforations in the shell D; F, a recess in the bottom of the steam-shell D, to hold the water made from the condensed steam and vegetables; G, cover fitting into recess F, with a flange on its outer edge, which, resting on the bottom of the recess, brings the top of the cover just even with the bottom of the steamer; H, a perforated inverted cone, attached to cover G, for the water from the condensed steam to pass through into the recess under the cover G; I, handle to cover G; K K, handles to the steamer; L L, handles to pot A; M, handle to cover C; N, rim on shell B, forming a shoulder, which supports the steamer on pot A.

Operation.

Put water in pot A, and set it over a fire where the water will boil. Set the steamer on to it, as shown in fig. 1; put vegetables to be cooked inside of shell D, resting on its bottom, and cover them up with cover C. As the water boils in pot A, steam ascends up the space between shells B and D, and is forced through perforations E into the interior of the steamer, and, coming in contact with the vegetables, cooks them. A portion of the steam passes out and around cover C, and a portion is condensed, and the water therefrom falls into recess F, taking with it all unpleasantness of taste from the vegetables, where it remains till the cooked vegetables are removed, when the water can be turned out.

What I claim as my invention, and desire to secure by Letters Patent, is—

The tight bottom on shell D, containing a recess, F, to catch the condensed steam, and the raw, ill-tasting vegetable-water, and prevent this liquid from falling into the water below, with cover G, and strainer H, substantially as and for the purpose described.

HEINRICH A. ZOPFF.

Witnesses:
 J. B. SMITH,
 PERCY B. SMITH.